(12) United States Patent
Martin et al.

(10) Patent No.: US 8,662,272 B2
(45) Date of Patent: Mar. 4, 2014

(54) PRESSURE MEDIUM SUPPLY DEVICE OF A HYDRAULICALLY ACTUATED SHIFTING ELEMENT

(75) Inventors: Hans-Joachim Martin, Kressbronn (DE); Anton Fritzer, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 262 days.

(21) Appl. No.: 13/377,616

(22) PCT Filed: Jun. 1, 2010

(86) PCT No.: PCT/EP2010/057595
§ 371 (c)(1),
(2), (4) Date: Dec. 12, 2011

(87) PCT Pub. No.: WO2010/149470
PCT Pub. Date: Dec. 29, 2010

(65) Prior Publication Data
US 2012/0085614 A1  Apr. 12, 2012

(30) Foreign Application Priority Data
Jun. 23, 2009 (DE) .......... 10 2009 027 097

(51) Int. Cl.
*F16D 25/10* (2006.01)
*F16D 25/12* (2006.01)

(52) U.S. Cl.
USPC .................. 192/48.601; 192/85.63

(58) Field of Classification Search
USPC ............. 192/48.601, 85.01, 85.63, 109 F
See application file for complete search history.

(56) References Cited

U.S. PATENT DOCUMENTS

| | | | |
|---|---|---|---|
| 3,262,531 A * | 7/1966 | Black et al. | 192/48.613 |
| 4,830,046 A | 5/1989 | Holt | |
| 7,363,939 B2 | 4/2008 | Fritzer et al. | |
| 2008/0190729 A1 * | 8/2008 | Stehr et al. | 192/48.601 |

FOREIGN PATENT DOCUMENTS

| | | |
|---|---|---|
| DE | 196 05 225 A1 | 10/1996 |
| DE | 102 30 501 A1 | 1/2004 |
| DE | 103 11 482 A1 | 9/2004 |
| DE | 10 2004 007 750 A1 | 9/2005 |
| EP | 1 378 679 A2 | 1/2004 |
| EP | 1 657 464 A1 | 5/2006 |
| WO | 2006/002450 A1 | 1/2006 |

* cited by examiner

*Primary Examiner* — Richard M. Lorence
(74) *Attorney, Agent, or Firm* — Davis & Bujold, PLLC; Michael J. Bujold

(57) ABSTRACT

A pressure medium supply device of a hydraulically actuated shifting element (K1, K2) comprises at least one pressure medium supply duct (1, 2) in communication with a pump (4) and a line (3) for pre-filling of the shifting element. An additional pressure-retaining valve (9, 9') or a check diaphragm is integrated in the pressure medium supply duct (1, 2), between the shifting element and the shifting element valve (6, 7), and can be closed in the draining direction of the pressure medium supply duct (1, 2). The pressure-retaining valve (9, 9') is designed such that the shifting element can be drained and the pressure medium supply device can be vented.

4 Claims, 3 Drawing Sheets

PRESSURE MEDIUM SUPPLY DEVICE OF A HYDRAULICALLY ACTUATED SHIFTING ELEMENT

This application is a National Stage completion of PCT/EP2010/057595 filed Jun. 1, 2010, which claims priority from German patent application serial no. 10 2009 027 097.3 filed Jun. 23, 2009.

FIELD OF THE INVENTION

The invention concerns a pressure medium supply device of a hydraulically actuated shifting element.

BACKGROUND OF THE INVENTION

With hydraulically actuated shifting elements the problem arises that if the internal combustion engine is stopped even for only a short time, the clutch supply ducts are drained, which has the disadvantageous result that when the vehicle is restarted, these ducts first have to be filled again. This means that due to the additional time required for filling the clutch supply ducts, spontaneity is affected in a negative manner. In addition, the air present in the cutch supply ducts must be expelled from the ducts and this has a negative effect on the clutch filling times and also on the quality of shifting.

DE 102 305 01 A1 describes a clutch system comprising a clutch device with at least one clutch arrangement having an input side associated with an output shaft of a drive unit and an output side associated with a transmission input shaft, and which can be actuated by means of at least one hydraulic holding cylinder that rotates with it during operation.

The known clutch system comprises a statically arranged control/regulation valve system which is or can be connected on one side to a hydraulic pressure medium source and on the other side, via a rotary passage arrangement, to the hydraulic holding cylinder, such that a pressure medium reservoir is provided which, at least with a useful pressure medium holding area, is arranged above a height level defined by the rotary passage arrangement and from which pressure medium can be supplied to a section of the hydraulic system which comprises the rotary passage arrangement and connects the control/regulation valve arrangement to the hydraulic holding cylinder, in such manner that pressure medium is delivered at least at one leak point on the outflow side in order to counteract an outflow of pressure medium from the hydraulic system section and/or pressure medium is replenished via at least one inflow point into the hydraulic system section in order to compensate for any outflow of pressure medium from the hydraulic system section.

By virtue of this design, the escape of hydraulic medium from the hydraulic system should be reduced, and in particular draining of the clutch supply ducts when the motor stops for a short time should be prevented. Disadvantageously, the design known from DE 102 305 01 A1 is relatively complicated and involves high manufacturing, assembly and maintenance costs.

From DE 196 05 225 A1 a ball valve is known, which is designed such that a valve body, which can be pressed against a valve seat, is arranged to move within a duct and form a seal against a stretch that constitutes the valve seat. In this case the valve body seals so long as it is present in the duct; when the valve body is pushed out of the duct against the pressure of a spring, a gap opens and the valve is then open.

SUMMARY OF THE INVENTION

The purpose of the present invention is to indicate a pressure medium supply device of a hydraulically actuated shifting element, with which draining of the pressure medium ducts when the internal combustion engine stops for a short time is avoided in a simple and inexpensive manner.

Accordingly a pressure medium supply device of a hydraulically actuated shifting element comprises at least one pressure medium supply duct connected fluidically with a pump and with a line for pre-filling the shifting element, such that in the pressure medium supply duct an additional pressure-retaining valve or a check diaphragm is integrated between the shifting element and the shifting element valve, which can be closed in the draining direction of the pressure medium supply duct.

In this case the pressure-retaining valve is designed such that the shifting element can be drained and the pressure medium supply device can be vented.

In an embodiment of the invention the valve has a housing with an inlet and with an outlet located on the side of the valve that faces toward the shifting element, in which is arranged a valve seat for a valve body, the valve body being located on the side of the valve that faces toward the outlet so that when the pressure on the outlet side of the valve is higher than the pressure on the inlet side, the valve body can be pressed against the valve seat so that the valve closes.

Furthermore, the valve comprises a spring element arranged with pre-stress between the valve seat and a coverplate on the inlet side of the valve, in such manner that when the pressure on the outlet side of the valve is higher by a specified amount than the pressure on the inlet side, which is the case while the shifting element is being drained, the pressure results in compression of the spring element and therefore displacement of the valve seat in the direction toward the inlet side so that the pressure medium can flow past the valve seat, whereby the shifting element can always be opened.

Preferably, the spring element is designed and pre-stressed in such manner that it can only be compressed when the pressure on the outlet side exceeds the pressure on the inlet side by 0.3 bar.

In an advantageous further development of the invention, the pressure-retaining valve is designed such that the shifting element is filled via an integrated filling orifice plate. In this case, to drain the shifting element the integrated filling orifice plate is bypassed, whereby the draining times are made shorter.

In the case of a dual clutch, the pressure medium supply device comprises a respective pressure medium supply duct for each clutch, and according to the invention an additional pressure-retaining valve or check diaphragm is integrated in each pressure medium supply duct.

In a simple and inexpensive manner, the concept according to the invention prevents the pressure medium supply ducts of shifting elements from being able to drain when the internal combustion engine stops for a short time, and this considerably improves the shift quality of the primary shift process; for example, the pressure medium supply device described here can be used in vehicles with a start-stop function. Furthermore, it is ensured that the shifting element can still be drained and vented.

BRIEF DESCRIPTION OF THE DRAWINGS

Below, an example of the invention is explained in more detail with reference to the attached figures, which show.

DETAILED DESCRIPTION OF THE PREFERRED EMBODIMENTS

Figure 1:
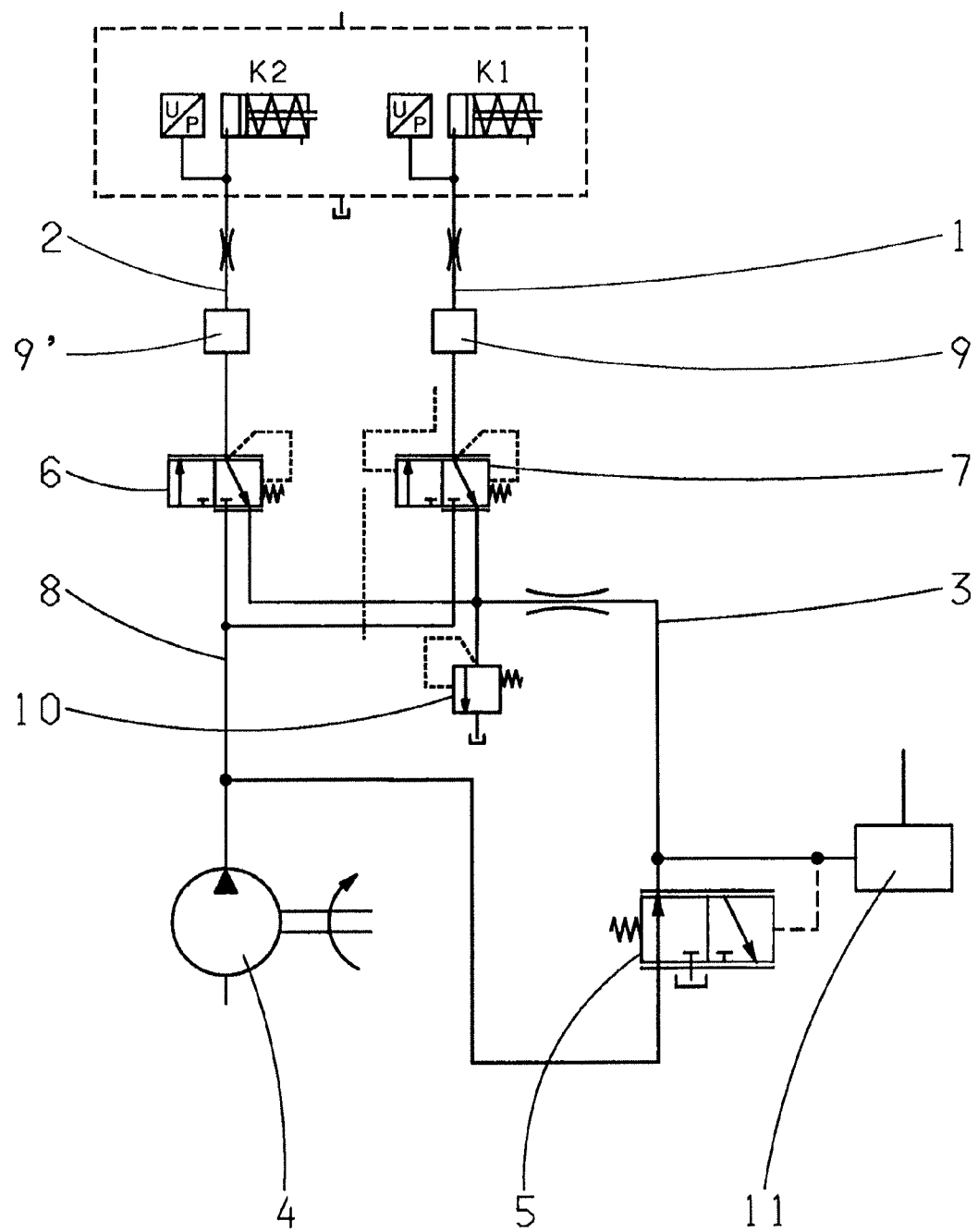
FIG. 1: A schematic representation of a possible embodiment of a pressure medium supply device of a hydraulically actuated dual clutch.

According to the invention, and referring to FIG. 1, the pressure medium supply device of a hydraulically actuated dual clutch comprises two pressure medium supply ducts 1, 2, each respectively associated with one clutch K1, K2 of the dual clutch and each comprising a respective clutch valve 6, 7. In addition a common line 3 for pre-filling the two clutches K1, K2 is provided, which is fluidically connected on the one hand to a pressure-limiting valve 5 arranged downstream from the pump 4 and on the other hand to the two pressure medium supply ducts 1, 2. The pressure medium supply ducts 1, 2 are connected to the pump 4 by a further line 8. In the attached figure a valve for setting the pre-filling pressure is indexed 10 and the pressure regulator is indexed 11.

According to the invention, in each of the pressure medium supply ducts 1, 2 an additional pressure-retaining valve 9, 9' or a check diaphragm is integrated between the shifting element K1, K2 and the respective shifting element valve 6, 7, so that the pressure medium supply ducts 1, 2 can be closed in their draining direction.

Without the valves 9, 9' arranged according to the invention, the pressure medium supply ducts 1, 2 of the clutches K1, K2 would drain more quickly when the motor stops.

Figure 2:
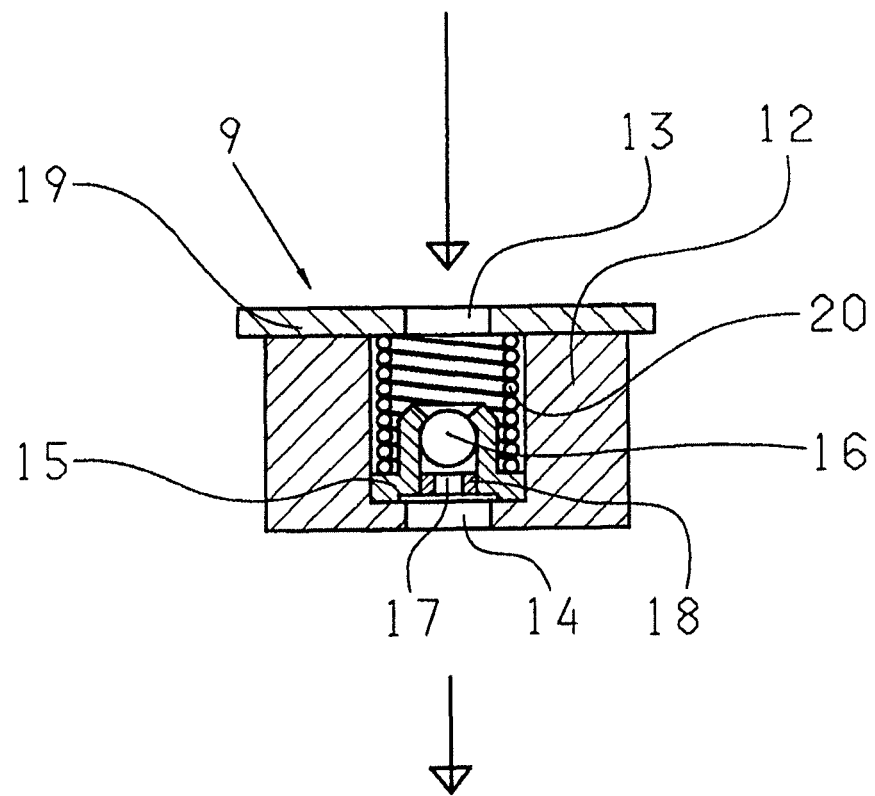
FIG. 2: A schematic sectional view of a pressure-retaining valve designed according to the invention.

The object of FIG. 2 is a pressure-retaining valve 9 provided in the pressure medium supply duct between a shifting element K1 and the shifting element valve 6.

The valve has a housing 12 with an inlet 13 and with an outlet 14 located on the side of the valve 9 that faces toward the shifting element, and in the housing 12 is arranged a valve seat 15 for a valve body 16 preferably in the form of a ball, the valve body being located on the side of the valve 9 that faces toward the outlet 14, i.e. toward the shifting element. The valve body 16 is held in the housing 12 by a closing cover 18 having at least one opening 17.

As can be seen from FIG. 2, the valve 9 comprises a spring element 20 arranged, with pre-stress, between the valve seat 15 and a covering element or cover-plate 19 on the inlet side of the valve.

The valve 9 functions as follows: when the pressure on the outlet side of the valve 9 is higher than the pressure on the inlet side, the valve body 16 is pressed against the valve seat 15, so closing the valve 9. This ensures that if the internal combustion engine is stopped for a short time, the pressure medium supply ducts from the shifting elements are not drained. But when the pressure on the outlet side of the valve 9 is higher than the pressure on the inlet side by a specified threshold value that depends on the design and pre-stressing of the spring element, which is the case when the shifting element is draining, this pressure compresses the spring element 20 and the valve seat 15 is then displaced toward the inlet side, so that the pressure medium can flow past the valve seat 15 whereby the shifting element can be opened at any time.

Preferably, the spring element is designed and pre-stressed in such manner that it can only be compressed by a pressure on the outlet side which exceeds the pressure on the inlet side by 0.3 bar. However, depending on the design of the system other threshold values can be set for the compression of the spring element.

Figure 3:
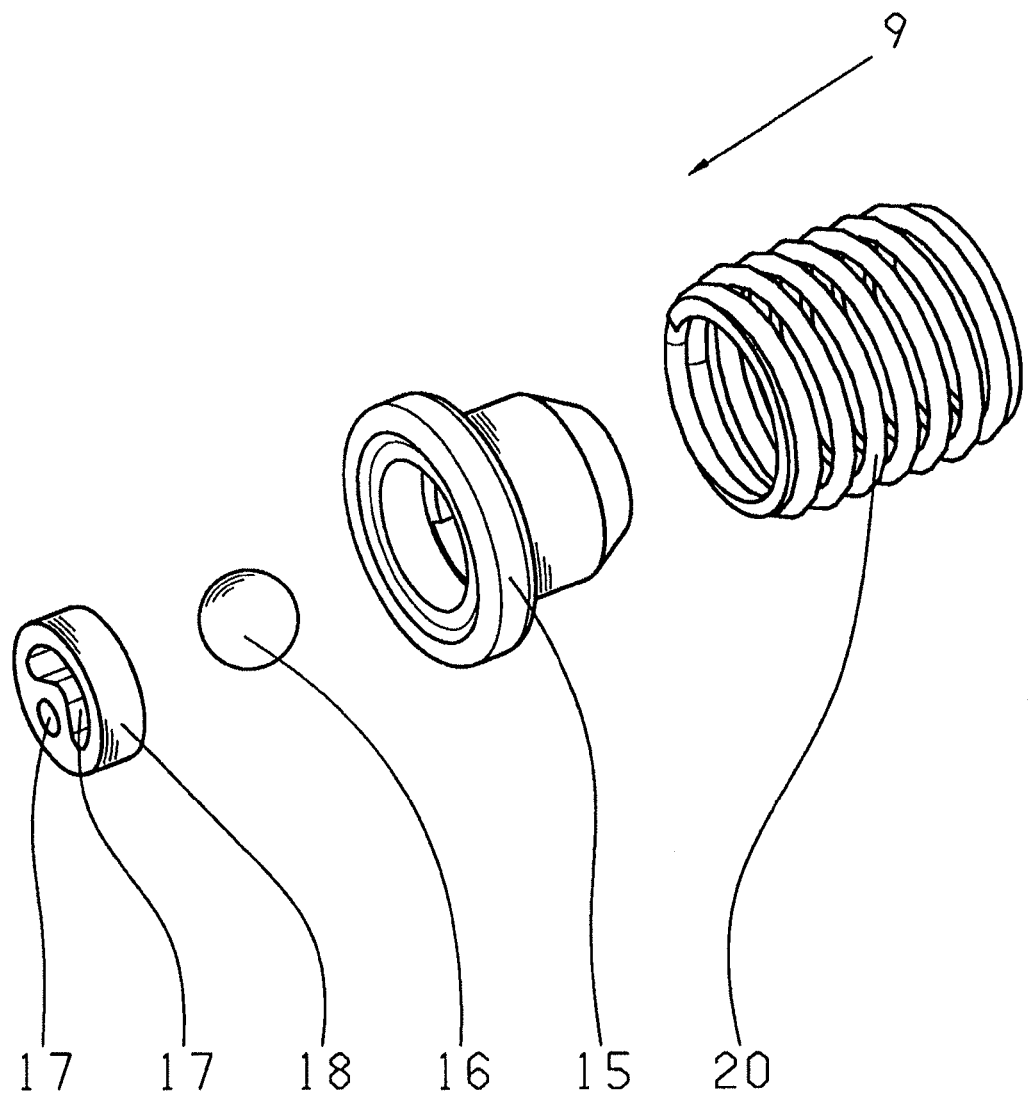
FIG. 3: A perspective, exploded representation of a pressure-retaining valve designed according to the invention.

To facilitate an understanding of the invention, FIG. 3 shows a perspective, exploded representation of the valve 9 illustrated in FIG. 2, without the valve housing and without the cover on the inlet side.

INDEXES

1 Pressure medium supply duct
2 Pressure medium supply duct
3 Line for pre-filling
4 Pump
5 Pressure-limiting valve
6 Clutch valve
7 Clutch valve
8 Line
9, 9' Pressure-retaining valve, check diaphragm
10 Valve for setting the pre-filling pressure
11 Pressure regulator
12 Housing
13 Inlet
14 Outlet
15 Valve seat
16 Valve body
17 Opening
18 Closing cover
19 Cover-plate
20 Spring element
K1 Shifting element
K2 Shifting element

The invention claimed is:

1. A pressure medium supply device of a hydraulically actuated shifting element (K1, K2), the pressure medium supply device comprising:

at least one pressure medium supply duct (1, 2) selective connectable to one of a first line (3), for pre-filling the shifting element, and to a further line (8), a pressure-retaining valve (9, 9') being integrated in the pressure medium supply duct (1, 2), between the shifting element and a shifting element valve (6, 7), such that the pressure-retaining valve (9, 9') is closable in a draining direction of the pressure medium supply duct (1, 2); and the pressure-retaining valve (9, 9'), when in an opened position, facilitates draining of the shifting element and venting of the pressure medium supply device;

wherein the pressure-retaining valve (9, 9') comprises a housing (12) with an inlet (13) and an outlet (14) which faces toward the shifting element (K1, K2), a valve seat (15) is located within the housing (12) adjacent an outlet side of the pressure-retaining valve, a valve body (16) engages with the valve seat (15) is retained within the housing (12) by a closing cover (18) which has at least one opening (17); when a pressure on the outlet side of the pressure-retaining valve (9, 9'), is greater than a pressure on an inlet side of the pressure-retaining valve (9, 9'), the valve body (16) is forced against the valve seat (15) so as to close the pressure-retaining valve (9, 9'); and the pressure-retaining valve (9, 9') further comprises a spring element (20) arranged, with pre-stress, between the valve seat (15) and either a cover element or a cover-plate (19) located on the inlet side of the pressure-retaining valve (9, 9'), the spring element (20) is designed and pre-stressed such that the spring element (20) is only compressed when the pressure on the outlet side of the pressure-retaining valve (9, 9') exceeds the pressure on the inlet side of the pressure-retaining valve (9, 9') by a specific amount, to facilitate drainage of the shifting element (K1, K2), which occurs by displacement of the valve seat (15) in a direction toward the inlet side of the pressure-retaining valve (9, 9') such that pressure medium flows past the valve seat (15) and out of the housing (12).

2. The pressure medium supply device according to claim 1, wherein the shifting element is a dual clutch and the pressure medium supply device comprises a first pressure medium supply duct (1) for a first of the dual clutches (K1, K2) and a second pressure medium supply duct (2) for a second of the dual clutches (K1, K2), and a pressure-retaining valve (9, 9') is integrated in each one of the first and the second separate pressure medium supply ducts (1, 2).

3. The pressure medium supply device of a hydraulically actuated shifting element (K1, K2) according to claim 1, wherein the spring element (20) is designed and pre-stressed in such manner that the spring element (20) can only be compressed when the pressure on the outlet side exceeds the pressure on the inlet side by 0.3 bar.

4. The pressure medium supply device of a hydraulically actuated shifting element (K1, K2) according to claim 1, wherein the valve body (16) is a ball.

\* \* \* \* \*